Nov. 6, 1923.
W. H. NOELTING
1,473,379
LEG MOUNT CASTER SUPPORT
Filed Nov. 25, 1922
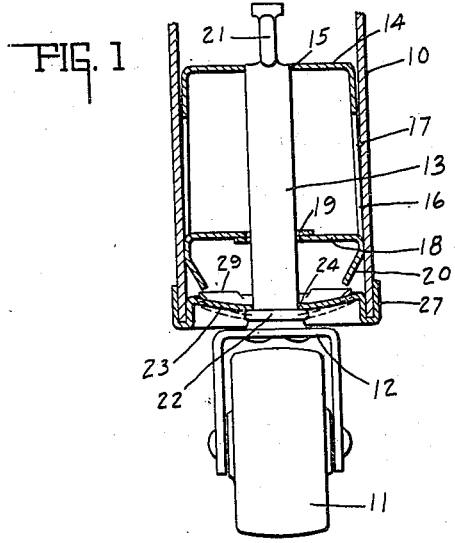
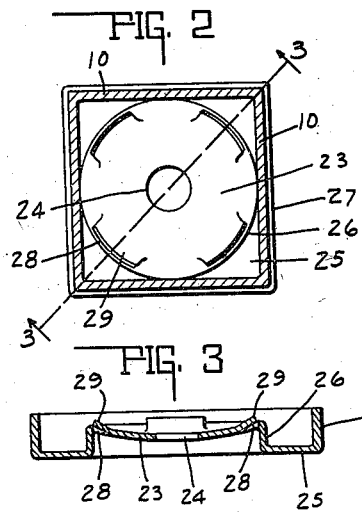
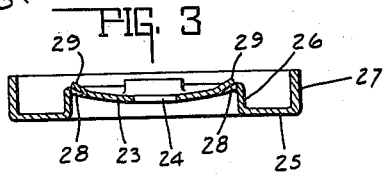
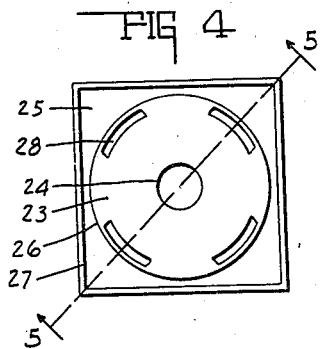
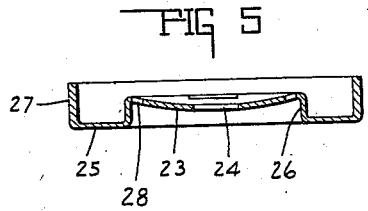
INVENTOR.
WILLIAM H. NOELTING.
BY
*Lockwood & Lockwood*
ATTORNEYS.

Patented Nov. 6, 1923.

1,473,379

UNITED STATES PATENT OFFICE.

WILLIAM H. NOELTING, OF EVANSVILLE, INDIANA, ASSIGNOR TO FAULTLESS CASTER COMPANY, OF EVANSVILLE, INDIANA, A CORPORATION.

LEG-MOUNT CASTER SUPPORT.

Application filed November 25, 1922. Serial No. 603,161.

*To all whom it may concern:*

Be it known that I, WILLIAM H. NOELTING, a citizen of the United States, and a resident of Evansville, county of Vanderburg, and State of Indiana, have invented a certain new and useful Leg-Mount Caster Support; and I do hereby declare that the following is a full, clear, and exact description thereof, reference being had to the accompanying drawings, in which like numerals refer to like parts.

This invention relates to a leg mount caster for tubular legs and the like.

The chief object of this invention is to provide a leg mount which will form an ornamental flange adjacent the end of the tubular leg and the like, and support said leg and grip the interior of the leg to retain the caster within the leg when the load is removed from the leg.

The chief feature of the invention consists in providing the leg mount with a dish-shaped construction and in slotting the same to increase the resiliency of the plate and thereby increase its gripping effect.

Another feature of the invention is to provide a leg mount for a leg having a polygonal peripheral outline with a polygonal ornamental flange for the exterior of the leg and an annular caster supported portion for sustaining the leg.

The full nature of this invention will be understood from the accompanying drawings and the following description and claims.

In the drawings Fig. 1 is a central sectional view taken on the line 1—1 of Fig. 2 and of a tubular leg construction provided with a caster and supported leg mount. Fig. 2 is a transverse sectional view of the end of the tubular leg and a plan view of a leg mount associated therewith. Fig. 3 is a cross sectional view of the leg mount taken on the line 3—3 of Fig. 2 and in the direction of the arrows. Fig. 4 is a top plan view of a modified form of the leg mount construction. Fig. 5 is a cross sectional view taken on the line 5—5 of Fig. 4 and in the direction of the arrows.

Several features of this invention are improvements upon the leg mount shown in the prior Patent No. 1,414,150, dated April 25, 1922.

In Figs. 1 and 2 there is illustrated a tubular leg 10 which is of relatively thin cross sectional area with respect to the diameter of the leg. It will be noted that the tubular leg is of polygonal outline and is herein illustrated as square. The caster construction associated with the tubular leg includes the wheel 11, the yoke 12 and the pintle 13. The caster may be retained within the tubular leg and the upper end thereof is centered within said leg by a spring member with yielding retaining arms comprising the spring guide member 14 which is centrally apertured at 15 to receive the upper end of the pintle 13 and is also provided with two parallel and downwardly extending arms 16 which are apertured at 17 to provide two inwardly extending intermediate projections 18 which also are apertured at 19, said apertures being adapted to register with each other and receive the caster pintle. Preferably the projecting arms 16 are turned inwardly at 20 to permit forcible removal of the caster when desired. The head of the pintle 13 is suitably enlarged or upset as indicated at 21 to retain the spring centering and yielding retaining member 14 or any other suitable means upon said pintle.

The pintle adjacent the yoke portion 12 is provided with an annular enlargement such as the ring portion 22, and seatable upon said ring portion is the leg mount construction which includes a downwardly-dished shaped plate portion 23 which is centrally apertured at 24 to provide an opening for the pintle 13 to extend therethrough. The base plate is indicated generally by the numeral 25 and said base plate preferably is of the same polygonal outline as that of the tubular leg. The circular or annular arcuate grooved dish-shaped plate 23 is connected to, and herein is shown preferably integral with the base 25 by the inner wall forming portion 26, said inner wall 26, as shown in Figs. 1 to 5 inclusive, being spaced from the outer walls 27 formed integral with the base 25 to form a groove adapted to receive the end of the tubular leg 10.

It will be observed from several figures that the outer and upwardly extending flanges 27 are substantially tangential to the annular central portion 23, although spaced therefrom. The disk-shaped plate, as shown clearly in several figures, is apertured or slotted at 28 and in Figs. 1, 2 and 3 and said slotting provides the upwardly extending projections 29. It will be noted that these apertures and slots are positioned intermediate what may be termed the tangential bearing portions, thereby increasing the resiliency of the plate without decreasing the strength of the gripping portion of said plate, which lies in a perpendicular to the point of tangency, or contact with the tubular leg. In Figs. 4 and 5, a modified form of the invention is illustrated and in said figures the apertures 28 are complete and no projections, such as are shown in Fig. 3, are provided for the same effect is secured by slotting the annular arcuate grooved plate portion.

It is to be observed that, as shown in the prior patent referred to, the walls 26 and 27 may be substantially parallel throughout, thus forming a U-shaped groove of substantially the same outline as that of the tubular leg. The plate portion 23 of such a construction may be either apertured as indicated at 28 or provided with projections as indicated at 29 without departing from the invention as herein disclosed.

The invention claimed is:

1. A leg mount for tubular legs, including a downwardly dish-shaped leg supporting plate having a central opening to receive a caster pintle and to be supported thereby, substantially continuous flange means engaging substantially the entire outer periphery of the tubular leg, and an intermediate portion connecting said downwardly dish-shaped leg supporting plate and engaging the inner periphery of the tubular leg, said plate being apertured to increase the resiliency thereof and increase the gripping action of the intermediate portion upon the inner periphery.

2. A leg mount for tubular legs, including a downwardly dish-shaped leg supporting plate having a central opening to receive a caster pintle and to be supported thereby, substantially continuous flange means engaging substantially the entire outer periphery of the tubular leg, and an intermediate portion connecting said downwardly dish-shaped leg supporting plate and engaging the inner periphery of the tubular leg, and projections on the plate to increase the resiliency thereof and increase the gripping action of the intermediate portion upon the inner periphery.

3. In a caster leg mount for tubular legs, the combination with a polygonal base, including an arcuate annular portion having a central opening and sides extending upwardly from said base in tangential relation to said annular portion, said side and said annular portion at the point of tangency forming a U-shaped groove for engaging the opposite sides of said tubular leg, and that portion intermediate the points of tangency being formed for increasing the resiliency of the base.

In witness whereof, I have hereunto affixed my signature.

WILLIAM H. NOELTING.